Patented Oct. 20, 1953

2,656,348

UNITED STATES PATENT OFFICE 2,656,348

STEROIDS HAVING A 17-POSITIONED SEMI-CYCLIC DOUBLE BOND

Karl Miescher, Riehen, Albert Wettstein and Julius Schmidlin, Basel, Switzerland, assignors to Ciba Pharmaceutical Products, Inc., Summit, N. J.

No Drawing. Application July 25, 1950, Serial No. 175,881. In Switzerland July 27, 1949

8 Claims. (Cl. 260—239.55)

1

The present invention relates to steroids having a semi-cyclic double bond in the 17-position, and to the preparation thereof.

The products of the present invention are intended to find application as therapeutic agents, or as intermediate products for the manufacture of therapeutic agents. It is known to prepare 17-ketones by degradation of the side chain of sterols and bile acids. Where the starting materials which are subjected to such degradation process are substituted in ring C—and particularly when the substituent is in 12-position—very bad yields are obtained in some cases. However, ring C substituted compounds which contain a 17-positioned semi-cyclic double bond, according to the present invention, can be converted in good yield into 17-ketones. The invention therefore provides an efficient way for converting the aforesaid starting materials into the 17-ketones. Furthermore, the $\Delta^{17}$-pregnene-21-als have hitherto been available only by tedious methods. They have been produced for example by the building up of a side chain on a 17-ketone, which was itself obtained by the total degradation of a sterol, bile acid or pregnane side chain. The present invention makes possible the direct production of the said aldehydes from corresponding pregnane or pregnene compounds. Some of these aldehydes, e. g. $\Delta^{17}$-3,12-diacyloxy-pregnene-21-als and $\Delta^{17}$-3-keto-12-acyloxy-pregnene-21-als are new. The latter compounds are of great importance in connection with the preparation of cortisone.

The new steroids according to the present invention are obtained, briefly stated, by the splitting out of water, directly or indirectly, from secondary 20-ols of the pregnane series which contain in 17-position a hydrogen atom and in 21-position a substituted methylidene group, with the formation of a double bond.

Thus, in the case of 21-benzylidene-3,12-diacetoxy-pregnane-20-ol, the reaction is as follows:

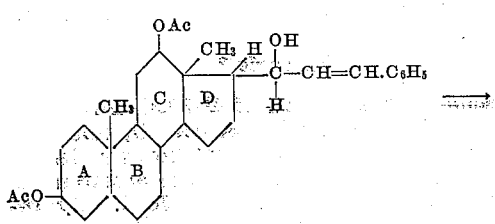

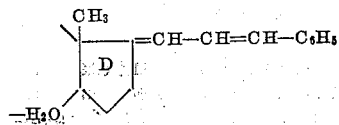

The starting materials, secondary pregnane-20-ols and pregnene-20-ols, contain in 21-position a substituted methylidene group. Illustrative of starting materials for use in the present invention are the aryl substituted 21-methylidene compounds, such as benzylidene and naphthyl-methylidene derivatives which may be substituted or unsubstituted in the aromatic ring, and the 21-furfurylidene compounds. These starting materials can also be further substituted in the steroid residue, as in the 7- and 11- and in particular in the 3- and 12-position, for example by keto groups, free or functionally converted hydroxyl groups, for example acetoxy, benzoyloxy, tosyloxy, alkoxy, such as methoxy or triphenyl methoxy groups, or halogen atoms. Moreover they can for example have double bonds in 4-, 5-, 9- or 11-position.

The requisite starting materials can be prepared for example by reduction of the keto group of corresponding derivatives of pregnane-20-ones and pregnene-20-ones in per se known manner.

The splitting out of water in accordance with the present process can be carried out directly or indirectly. For the direct water splitting, there is suitable treatment with dehydrating agents, such as concentrated organic or inorganic acids or their anhydrides, for example fatty acids, hydrohalic acids and phosphorus pentoxide, or inorganic salts, for example zinc chloride or potassium bisulfate, and also catalytically active agents, such as iodine in the presence or absence of diluents. The employment, in this connection, of lower organic fatty acids, such as acetic acid, propionic acid, butyric acid and so on, is particularly advantageous. Thus for example on boiling of 3,12,20-trihydroxy-21-methylidene-pregnanes with glacial acetic acid the hydroxyl group in 3-position is acetylated, whereas that in 20-position is split off with formation of a 17,20-double bond and that in 12-position remains unaffected. In the indirect splitting out of water, the secondary 20-hydroxyl group is first replaced for example by halogen or by another ester residue, for example the xanthogen ester residue, or by an ether residue. Subsequently a hydroxyl group thus converted can be removed for example by thermal decomposition or by treatment with an agent which splits off acid or alcohol.

The Δ[17]-pregnenes, thus prepared according to the present invention, are readily convertible into ketones and aldehydes by oxidation, as for example thus:

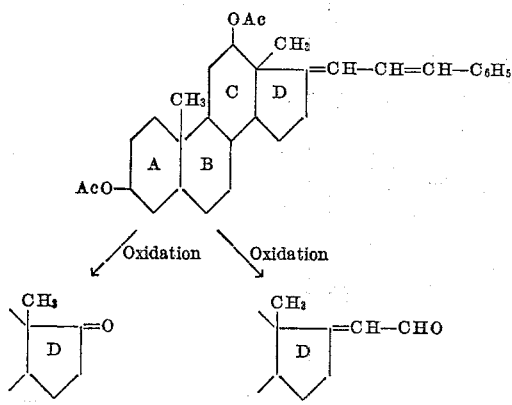

It has been found that, e. g. starting from secondary pregnane-20-ols and pregnene-20-ols which contain in 21-position a substituted methylidene group 17-ketones and Δ[17]-pregnene-21-als can be obtained by suitably choosing the oxidation method. The course of the oxidation is especially influenced by substituents in ring C, primarily by an esterified hydroxyl group in 12-position. 12-hydroxy compounds which are esterified in 12-position by a lower organic acid, e. g. acetic acid, under certain conditions of oxidation, yield mainly 17-ketones, whereas those 12-hydroxy compounds which are esterified in 12-position by a higher organic acid, especially toluene sulfonic acid, give a good yield of Δ[17]-pregnene-21-als.

For the oxidation, use may be made for example of compounds of hexavalent chromium, such as chromic acid or chromyl chloride, and also permanganates, ozonization and the splitting of the ozonides, the action of peroxides, such as benzo-peracid, phthalic mono-peracid or hydrogen peroxide, advantageously in the presence of osmium tetroxide, and the splitting of the glycols produced by the hydrolysis of the oxide ring or by the direct attachment of two hydroxyl groups to the double bond in each case, for example by means of chromic acid, lead tetraacetate or periodic acid.

If double bonds are present in the steroid nucleus, these are suitably protected from oxidation in known manner for example by means of halogen or hydrogen halide in cases where such protection is not rendered superfluous by the particular properties of the unsaturated system, as for example in the case of a double bond with keto group in α-position or a double bond in 11,12-position. Moreover oxidizable substituents such as hydroxyl groups can be protected in known manner for example by esterification or etherification and after the oxidation, partially or wholly again liberated, as desired, for example by the action of hydrolyzing agents. If however a conversion is desired of free ring carbinol to keto groups, this can be carried out in known manner at the same time as the oxidation in the side chain or in a separate reaction, in particular under the influence of oxidizing or dehydrogenating agents.

The following examples illustrate the invention, the parts being by weight unless otherwise stated and the relationship of parts by weight and parts by volume being the same as that of the kilogram to the liter:

Example 1

6.8 parts of crude 3α,12α,20-trihydroxy-21-benzylidene-pregnane are dissolved in 200 parts by volume of glacial acetic acid and the whole boiled for 6 hours under reflux. The acetic acid is thereupon distilled off in vacuum and the residue taken up in methylene chloride. The solution after washing with water, 2 per cent sodium bicarbonate solution and water is dried over sodium sulfate and the filtrate concentrated by evaporation. The Δ[17]-3α-acetoxy-12α-hydroxy-21-benzylidene-pregnene of the formula

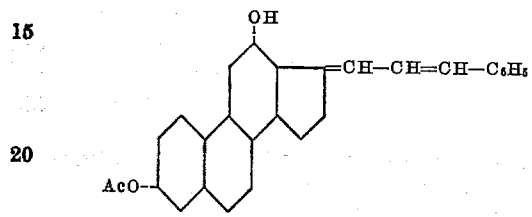

crystallizes from ether in colorless prisms which melt at 220–223° C. $[\alpha]_D^{21}=+78°$ ($c=1.044$ in chloroform).

In strictly analogous manner, other secondary 20-ols with a substituted methylidene group in 21 position can be converted into the corresponding steroids having a semi-cyclic double bond in 17-position. Thus 3α,12α,20-trihydroxy-21-furfurylidene-pregnane yields Δ[17]-3α-acetoxy-12α-hydroxy-21-furfurylidene-pregnene.

For the splitting off of the water, instead of glacial acetic acid, also formic acid or propionic acid can be used, while otherwise proceeding as above.

In this way Δ[17]-3α-formyloxy- and Δ[17]-3α-propionyloxy - 12α - hydroxy - 21 - benzylidene-pregnene and Δ[17]-3α-formyloxy- and Δ[17]-3α-propionyloxy - 12α - hydroxy - 21 - furfurylidene-pregnene are obtained.

The 21-benzylidene-pregnane-20-ol employed above is prepared for example as follows:

8.12 parts of 3α,12α-diacetoxy-20-keto-21-benzylidene-pregnane and 24.5 parts of aluminum isopropylate are dissolved in 360 parts by volume of anhydrous isopropanol and the mixture subjected to a slow distillation during 12 hours for removal of the acetone produced in the reduction. The reaction mixture which is finally concentrated to about 100 parts by volume is allowed to cool, treated with 800 parts by volume of molar Rochelle salt solution and the separated triol taken up in methylene chloride. It is washed with water, dried and evaporated. The crude 21-benzylidene-20-ol thus obtained is suitably subjected to splitting out of water and simultaneous partial acetylation prior to purification.

From ethyl acetate the pure 3α,12α,20-trihydroxy-21-benzylidene-pregnane crystallizes in colorless small needles which melt at 148–150° C. By heating for 2 hours with acetic anhydride in the presence of pyridine on the water bath there is obtained from the triol a triacetate which melts at 185–187° C. $[\alpha]_D^{23}=+47°$ ($c=0.776$ in dioxane).

Example 2

A solution of 4.07 parts of Δ[5]-3β,20-dihydroxy-21-benzylidene-pregnene in 80 parts by volume of glacial acetic acid is boiled for 6 hours under reflux. The working up takes place according to the method described in Example 1. By recrystallization from ether there is obtained the $\Delta^{5,17}$-3β-acetoxy-21-benzylidene-pregnadiene of the formula

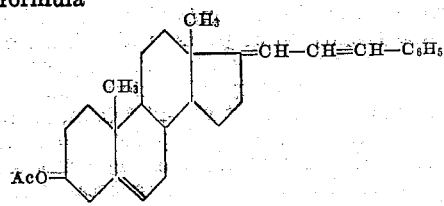

in needles which melt at 185–187° C.

$[\alpha]_D^{25} = -93°$ (c = 1.210 in chloroform).

According to the above procedure $\Delta^5$-3β,20-dihydroxy-21-naphthyl-methylidene-pregnene is converted into $\Delta^{5,17}$-3β-acetoxy-21-naphthyl-methylidene-pregnadiene.

Instead of glacial acetic acid, there can also be used for the splitting out of water formic acid or oxalic acid, while otherwise proceeding as above, whereby the corresponding 3-formyloxy- and propionyloxy compounds are obtained.

The 21-benzylidene-pregnane-20-ol employed as starting material is prepared for example as follows:

6.07 parts of $\Delta^5$-3β-hydroxy-20-keto-21-benzylidene-pregnene and 24.5 parts of aluminium isopropylate are dissolved in 480 parts by volume of anhydrous isopropanol and the mixture subjected to a slow distillation for 8 hours in order to remove the acetone produced in the reduction. The working up takes place as described in Example 1. The $\Delta^5$-3β,20-dihydroxy-21-benzylidene-pregnene is obtained from methylene chloride-petroleum ether in colorless crystals which melt at 169–172° C. $[\alpha]_D^{24} = -62°$ (c = 1.028 in chloroform).

The following examples illustrate the conversion of the compounds of the invention into ketones and aldehydes by oxidation.

Example 3

The $\Delta^{17}$-3α-acetoxy-12α-hydroxy-21-benzylidene-pregnene is first tosylized to the $\Delta^{17}$-3α-acetoxy-12α-tosyloxy-21-benzylidene-pregnene. 3.32 parts of the latter are dissolved in 1500 parts by volume of anhydrous ethyl acetate, the solution cooled to —40° C. and 1.2 mol-equivalents of ozone passed in. After blowing off the excess ozone with nitrogen, the reaction mixture is heated to room temperature and then after the addition of 15 parts of palladium-calcium carbonate catalyst, shaken in a hydrogen atmosphere until no more hydrogen is taken up. The solution, filtered from catalyst, is evaporated to dryness in vacuum and the residue chromatographed over 120 parts of aluminum oxide. The substance eluated by means of a hexane-benzene mixture (1:1) or pure benzene, yields after recrystallization from ether-petroleum ether the $\Delta^{17}$-3α-acetoxy-12α-tosyloxy-pregnene-21-al of the formula

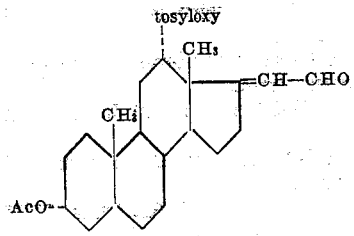

in colorless small plates which melt at 150–151° C. (with decomposition). $[\alpha]_D^{22} = +150°$ (c = 0.991 in chloroform).

The compound gives with 1:4-dihydroxynaphthalene the Raudnitz and Puluj reaction characteristic of aldehydes.

This compound is obtained in a still better yield by carrying out the oxidation as follows:

Through two dropping funnels there are simultaneously added in the course of 9 hours, with exclusion of oxygen and moisture, 500 parts by volume of a 0.04 molar solution of $\Delta^{17}$-3α-acetoxy-12α-tosyloxy-21-benzylidene-pregnene and 75 parts by volume of a 0.8 molar anhydrous ethereal solution of hydrogen peroxide to a stirred mixture of 50 parts of anhydrous sodium sulfate, 0.25 part of osmium tetroxide and 200 parts by volume of dry ether. In order to complete the oxidation, the reaction mixture is stirred for another 24 hours at room temperature, and then diluted with 1000 parts by volume of ether and for the removal of the osmium agitated for 24 hours with a solution of 6 parts of sodium sulfite in 500 parts by volume of water. The aqueous layer is then removed and extracted three times with 500 parts by volume of ether on each occasion, and the combined ethereal solutions are washed in turn with water, 2% sodium bicarbonate solution, and water, then dried with sodium sulfate, and filtered and the ether distilled off. The residue is dissolved in 50 parts by volume of anhydrous pyridine and 30 parts by volume of acetic anhydride and the mixture allowed to stand at room temperature under moisture seal.

After 16 hours the excess of pyridine and acetic anhydride and the acetic acid that has formed are distilled off under reduced pressure at not more than 25° C. The residue is taken up in ether and the solution washed consecutively with 1N-hydrochloric acid, water, 2% sodium bicarbonate solution, and water, then dried with sodium sulfate, filtered, and evaporated. The crude product smells strongly of benzaldehyde. By recrystallization from a mixture of ether and petroleum ether it yields $\Delta^{17}$-3α-acetoxy-12α-tosyloxy-pregnene-21-al of M. P. 150–151° C.

It has the formula

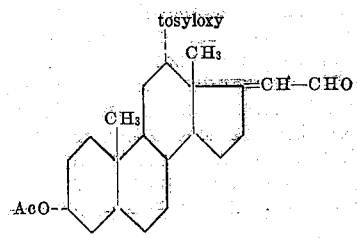

The $\Delta^{17}$-3α-acetoxy-12α-tosyloxy-21-benzylidene-pregnene is prepared for example as follows:

1.5 parts of $\Delta^{17}$-3α-acetoxy-12α-hydroxy-21-benzylidene-pregnene and 3.0 parts of p-toluenesulfochloride are allowed to stand at about 30° C. in 10 parts by volume of pyridine for 6 days with exclusion of moisture. The solution is then treated at 0° C. carefully with 3 parts by volume of water, the tosylate, precipitated by further addition of water, taken up in ether and washed consecutively with 0.5N-hydrochloric acid, water, 0.5N-sodium bicarbonate and water. The dried ether solution is evaporated and the crude product crystallized from 95 per cent ethanol. By recrystallization from hexane, the $\Delta^{17}$-3α-acetoxy-12α-tosyloxy-21-benzylidene-pregnene is obtained as colorless flat prisms of double melting point 101–104° C. and 125–126° C. (with decomposition). $[\alpha]_D^{23} = +140°$ (c = 1.044 in chloroform).

Example 4

2.7 parts of $\Delta^{17}$-3a,12a-diacetoxy-21-benzylidene-pregnene are dissolved in 1500 parts by volume of anhydrous ethyl acetate, the whole cooled to —25° C. and 6.5 mol-equivalents of ozone passed in. The excess of ozone is blown off with nitrogen shortly after the completion of the introduction and the solution, after addition of 200 parts by volume of glacial acetic acid and 57 parts of zinc dust, stirred for 1 hour at room temperature. The zinc dust is then filtered off and the liquid evaporated in vacuum. The residue is taken up in ether, the solution washed with 2 per cent sodium carbonate solution and water, dried and evaporated. The crude neutral substance is chromatographed on 60 parts of aluminum oxide. With pure hexane only low molecular splitting products are dissolved out. A hexane-benzene mixture (1:1) eluates the 3a,12a-diacetoxy-aetiocholane-17-one of the formula

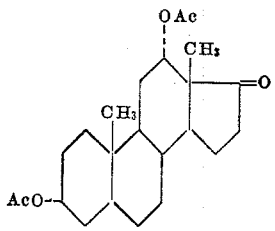

which is recrystallized from ether-petroleum ether. Colorless prisms are obtained which melt at 152–153° C. $[a]_D^{22} = +180°$ ($c=1.055$ in acetone).

The $\Delta^{17}$-3a,12a-diacetoxy-21-benzylidene-pregnene employed as starting material is for example prepared as follows:

2.8 parts of $\Delta^{17}$-3a-acetoxy-12a-hydroxy-21-benzylidene-pregnene are heated to 95–100° C. for 2½ hours in a nitrogen atmosphere with 50 parts by volume of pyridine and 20 parts by volume of acetic anhydride. The reaction mixture is thereupon evaporated in vacuum and the residue taken up in either. The ethereal solution is washed consecutively with 0.5N-hydrochloric acid, water, 0.5N-sodium bicarbonate and water, dried and evaporated. The $\Delta^{17}$-3a,12a-diacetoxy-21-benzylidene-pregnene crystallizes from ether-isopropyl ether in colorless small needles. On introduction into a block preheated to 162° C. the substance melts, and may afterwards solidify again completely and then melts finally at 164–167° C. $[a]_D^{21} = +100°$ ($c=1.049$ in chloroform).

Example 5

The $\Delta^{5,17}$-3β-acetoxy-21-benzylidene-pregnadiene, obtained according to Example 2 may be oxidized to $\Delta^4$-androstene-3.17-dione:

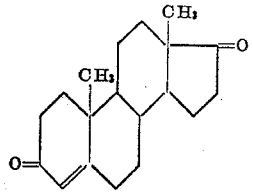

after preliminary conversion to $\Delta^{4,17}$-3-keto-benzylidene-pregnadiene.

A solution of 1.93 parts of the latter in 45 parts by volume of ethylene chloride and 250 parts by volume of 90 per cent acetic acid is treated slowly at 25° C., with stirring, with a solution of 2.80 parts of chromium trioxide in 125 parts by volume of 90 per cent acetic acid. After 16 hours the excess of chromium trioxide is carefully destroyed with sulphurous acid. The $\Delta^4$-androstene-3,17-dione is isolated from the neutral oxidation product by chromatography on 50 parts of aluminum oxide. The substance eluated with hexanebenzene mixture (1:1), after recrystallization from ether-petroleum ether melts at 169–171° C. and exhibits a specific rotation $[a]_D^{24} = +198°$ ($c=1.120$ in chloroform). In a mixed melting point test it proves to be identical with the substance known to be $\Delta^4$-androstene-3,17-dione.

The $\Delta^{4,17}$-3-keto-21-benzylidene-pregnadiene employed as starting material is obtained from $\Delta^{5,17}$-3β-acetoxy-21-benzylidene-pregnadiene in the following manner:

A supsension of 2.15 parts of $\Delta^{5,17}$-3β-acetoxy-21-benzylidene-pregnadiene in 110 parts by volume of methanol is, after addition of 1.40 parts of potassium carbonate in 14 parts by volume of water, heated to boiling for 2 hours. After cooling the whole is filtered with suction, washed with methanol and water and dried. There is obtained in this manner the $\Delta^{5,17}$-3β-hydroxy-21-benzylidene-pregnadiene in colorless small needles which melt at 184–188° C. $[a]_D^{24} = -99°$ ($c=1.023$ in chloroform).

For dehydrogenation 9.72 parts of the free hydroxy compound are treated with 1600 parts by volume of toluene and 200 parts by volume of cyclohexanone and the solution dehydrated by distilling off toluene. Then 5 parts of aluminum isopropylate are added and the whole boiled for 30 minutes. The cooled mixture is subjected to the addition of 600 parts by volume of molar Rochelle salt solution and treated with steam. The separated ketone is, after cooling, taken up in methylene chloride, washed with water and the dried solution evaporatred. The $\Delta^{4,17}$-3-keto - 21 - benzylidene-pregnadiene crystallizes from ether in colorless prisms of double melting point 179–181° C. and 194–198° C. $[a]_D^{24} = +37°$ ($c=1.175$ in chloroform).

What we claim is:

1. The $\Delta^{17}$-pregnenes with a substituent selected from the class consisting of a benzylidene, naphthyl-methylidene and furfurylidene group in 21-position.

2. The $\Delta^{17}$-pregnenes with a substituent selected from the class consisting of a benzylidene, naphthyl-methylidene and furfurylidene group in 21-position, which contain in 3- and 12-position a member selected from the group consisting of oxo, hydroxy and lower alkanoic acid ester groups.

3. The ring unsaturated $\Delta^{17}$-pregnadienes with a substituent selected from the class consisting of a benzylidene, naphthyl-methylidene and furfurylidene group in 21-position, which contain in 3-position a member selected from the group consisting of oxo, hydroxy and lower alkanoic acid ester groups.

4. The $\Delta^{17}$-3-keto-12-tosyloxy-21-benzylidene-pregnene.

5. The $\Delta^{17}$-3a-acetoxy-12a-tosyloxy-21-benzylidene-pregnene.

6. The $\Delta^{17}$ - 3a - propionyloxy-12a-hydroxy-21-furfurylidene-pregnene.

7. The $\Delta^{5,17}$-3β-acetoxy-21-benzylidene - pregnadiene.

8. The $\Delta^{17}$-3a-acetoxy-12a-hydroxy-21-benzylidene-pregnene.

KARL MIESCHER.
ALBERT WETTSTEIN.
JULIUS SCHMIDLIN.

No references cited.